United States Patent
Gadot et al.

(10) Patent No.: US 9,491,263 B2
(45) Date of Patent: Nov. 8, 2016

(54) SYSTEMS AND METHODS FOR AUTOMATICALLY MODIFYING A PICTURE OR A VIDEO CONTAINING A FACE

(71) Applicant: Pixtr Ltd., Haifa (IL)

(72) Inventors: Aviv Gadot, Haifa (IL); Yaron Recher, Haifa (IL)

(73) Assignee: PIXTR LTD., Haifa (IL)

( * ) Notice: Subject to any disclaimer, the term of this patent is extended or adjusted under 35 U.S.C. 154(b) by 51 days.

(21) Appl. No.: 14/564,877

(22) Filed: Dec. 9, 2014

(65) Prior Publication Data

US 2015/0199558 A1 Jul. 16, 2015

Related U.S. Application Data

(60) Provisional application No. 61/926,188, filed on Jan. 10, 2014.

(51) Int. Cl.
| | |
|---|---|
| G06K 9/00 | (2006.01) |
| H04L 29/06 | (2006.01) |
| G06T 11/60 | (2006.01) |
| G06K 9/62 | (2006.01) |
| H04N 21/44 | (2011.01) |

(52) U.S. Cl.
CPC ............... *H04L 67/42* (2013.01); *G06T 11/60* (2013.01); *G06K 9/00248* (2013.01); *G06K 9/6206* (2013.01); *H04N 21/44008* (2013.01)

(58) Field of Classification Search
None
See application file for complete search history.

(56) References Cited

U.S. PATENT DOCUMENTS

| | | | | |
|---|---|---|---|---|
| 2006/0023923 | A1* | 2/2006 | Geng | ...................... G06T 19/20 382/116 |
| 2007/0071290 | A1* | 3/2007 | Shah | ................... G06K 9/00288 382/118 |
| 2007/0258656 | A1* | 11/2007 | Aarabi | ............... G06K 9/00228 382/254 |

* cited by examiner

*Primary Examiner* — Hadi Akhavannik
(74) *Attorney, Agent, or Firm* — Foley & Lardner LLP; James De Vellis

(57) ABSTRACT

Systems and methods for automatically adjusting a picture or a video containing a face, by detecting the face in a picture, constructing a face-structure mask for the face, obtaining a set of model face-structure masks and modification instructions, and modifying the face. The disclosure further provides for displaying the modified picture, receiving user feedback regarding the modifications, and processing the user feedback.

21 Claims, 5 Drawing Sheets

SYSTEMS AND METHODS FOR AUTOMATICALLY MODIFYING A PICTURE OR A VIDEO CONTAINING A FACE

RELATED APPLICATION

This application claims priority to U.S. Provisional Application No. 61/926,188, filed Jan. 10, 2014 the content of which is incorporated herein by reference in its entirety.

FIELD OF THE DISCLOSURE

The present system and methods described herein generally relate to face detection, face picture modification, and machine learning.

BACKGROUND

In today's digital age, people are able to share their lives with their family, friends, and even strangers, in unprecedented levels. Social media services, such as Facebook™, allow their users to upload personal information, photos, videos, and other media contents online. Online dating sites, such as eHarmony™, allow users to look for love by searching through profiles, including profile pictures, of other users.

Often times, users of social media services and online dating sites would like to improve pictures of themselves before they share it with others. Some users modify their pictures by, for example, using software to delete blemishes, blur out wrinkles, correct red eyes, or readjust their skin tones. While some of these modifications can be done automatically, other modifications to the picture can only be done manually by using a photo editing program. However, photo editing programs are often expensive, require expertise or special training to use, and are highly dependent on the human editor's skill and patience to produce an acceptably modified picture.

SUMMARY

It is desirable for users who are not skilled in using photo editing software to be able to modify pictures of themselves or others automatically. It is further desirable that users be able to modify videos of themselves or others. It is also desirable that these automatic modifications be simple to implement and be available through mobile, wearable, and tablet devices which often include cameras to take pictures. Furthermore, it is desirable that automatic modifications take into account the user's preferences as to what kinds of modifications they like. Additionally, because the modifications are automatic, it is desirable that these automatic modifications take into account different ideas of what a more attractive face looks like, based on the user's country, culture, and other pertinent user information. Finally, it is also desirable that these modifications improve over time as personal and societal conception of beauty changes.

Accordingly, systems and methods disclosed herein provide for automatic modification of a picture of a face. At a user's device, a face is detected in a picture, and a face-structure mask is constructed. The face-structure mask is used to align the face, and the aligned face is projected to a face space using Fisher Faces, resulting in vector coordinates to the face space. The resulting vector is sent by the device to a server through a network connection. The server determines the category to which the vector belongs. The server then selects a number of model face-structure masks associated with the category. The server also locates a set of modification instructions that are appropriate to the category. The server sends associated face-structure masks and modification instructions back to the user's device. The picture is then automatically modified according to the instructions. The user is then able to look at the modifications and select which ones to keep or share on a social media site.

BRIEF DESCRIPTION OF THE DRAWINGS

The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
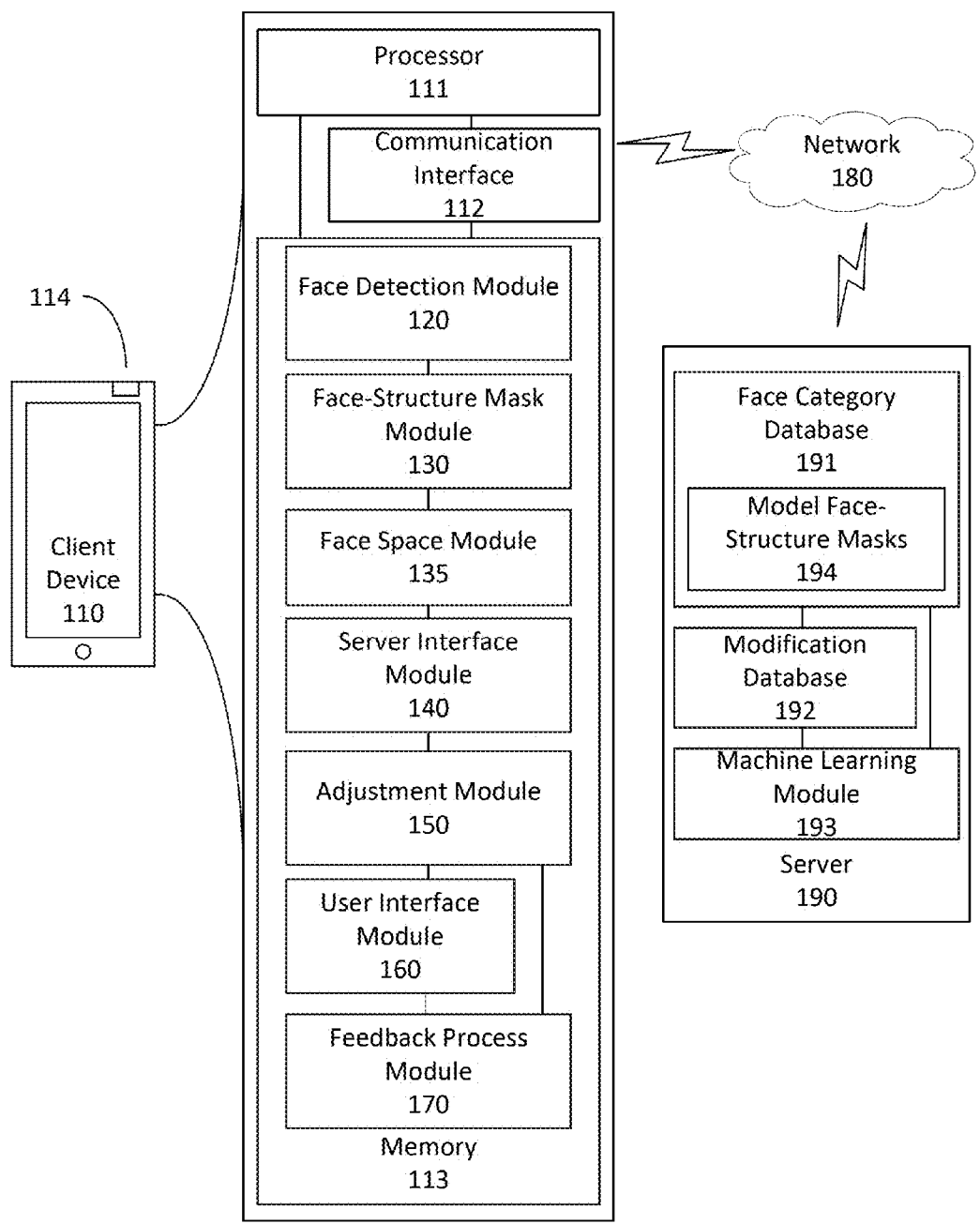
FIG. 1 is a block diagram of a computerized architecture for automatically modifying facial images.

FIG. 1 shows a diagram of a computer architecture 100 for automatically modifying facial images that includes a client device 110 and a server 190. Some implementations may not require a server 190. The client device 110 includes a processor 111, a communication interface 112, and a memory 113. Optionally, the client device may also include a camera 114. The architecture 100 includes memory 113, which contains software that when executed by the processor 111 will execute the methods of the present disclosure. The software may run as a stand-alone application or as a module or a plug-in to another software.

The software itself may be composed of different modules, including a face detection module 120, a face-structure mask module 130, a face space module 135, a server interface module 140, an adjustment module 150, a user interface module 160, and a feedback process module 170. The face detection module 120 is configured to detect one or more faces in a given picture. The face-structure mask module 130 constructs a face-structure mask 400 for a detected face and aligns the face. The face space module 135 projects the face to a face space defined by a set of Fisher Faces, which results in a vector coordinate in the face space defined by the Fisher Faces. The server interface module 140 sends the resulting face space vector and user information to a server 190 through the network 180. The server interface module 140 receives from the server 190 model face-structure masks and modification instructions. The adjustment module 150 adjusts the face using the constructed face-structure mask, the model face-structure masks, and the modification instructions. The user interface module 160 presents the adjusted picture or pictures to the user of the client device, and the module gathers user feedback on the presented picture or pictures. Finally, the feedback process module 170 takes the user feedback and processes it by sending the user feedback to the server 190 through the network 180, or by learning from the user feedback. Each of the modules will be described in further detail below.

The server 190 contains a face category database 191, a modification database 192 and a machine learning module 193. In some implementations, a server 190 is not required and all the components are stored within the memory 113 of the client device 110. The face category database 191 contains model face-structure masks 194 associated with each face category. The face category database 191 and the modification database 192 may be combined in a single database or may each be multiple databases on different servers. The server 190 is configured to receive sent data and determine a face category as well as associated model face-structure masks 194 from the face category database 191. The server 190 uses the determined face category to look up face modification instructions associated with the face category in the modification database 192. The server 190 sends the model face-structure masks and the modification instructions associated with the face category back to the client device 110 through the network 180. The server 190 also includes a machine learning module 193 that modifies the face category database 191 and modification database 192 based on the user feedback from the feedback process module 170. The server 190 may be a plurality of servers or a set of hosted virtual machines connected to a network 180. The network 180 may be a local area network, a remote network, or a network of networks (e.g., internet).

The face detection module 120 implements, in the form of computer executable instructions, one or more face detection algorithms. Suitable face detection algorithms include, without limitations, the face detector in the Apple™ iOS™, the OpenCV's Haar face detector, or the Viola-Jones face detection algorithm. The face detection module 120 may also use a face detection method on a network 180 and receive a detected face through the communication interface 112. Alternatively, the user of the client device 110 may be queried to select a face in a picture. If, however, a face cannot be detected by any or some combination of these methods and algorithms, the face detection module 120 issues an error, informs the user, or terminates the software process. However, if a face is detected, the software passes the detected face to the face-structure mask module 130 for processing.

The face detection module 120 may use various schemes and strategies to combine the results of multiple face detection algorithms and methods. One way in which the face detection algorithms are combined is by first attempting to detect a face using a primary face detection algorithm. If the primary face detection detects a face, the software triggers execution of the face-structure mask module 130 to process the face. If, however, the primary face detection fails to detect a face, a secondary face detection algorithm is used. If a face is detected by the secondary face detection algorithm, the software triggers execution of the face-structure mask module 130 to process the face. If, however, the secondary face detection fails, the programs terminates. In such manner, multiple face detection methods may be serially employed. Finally, the face detection module 120 may detect multiple faces in a picture and send all the detected faces to the face-structure module 130 for processing. The face detection module 120 may also include a user interface processing for users to confirm the detected faces, or to select one face out of multiple detected faces for processing.

Figure 4:
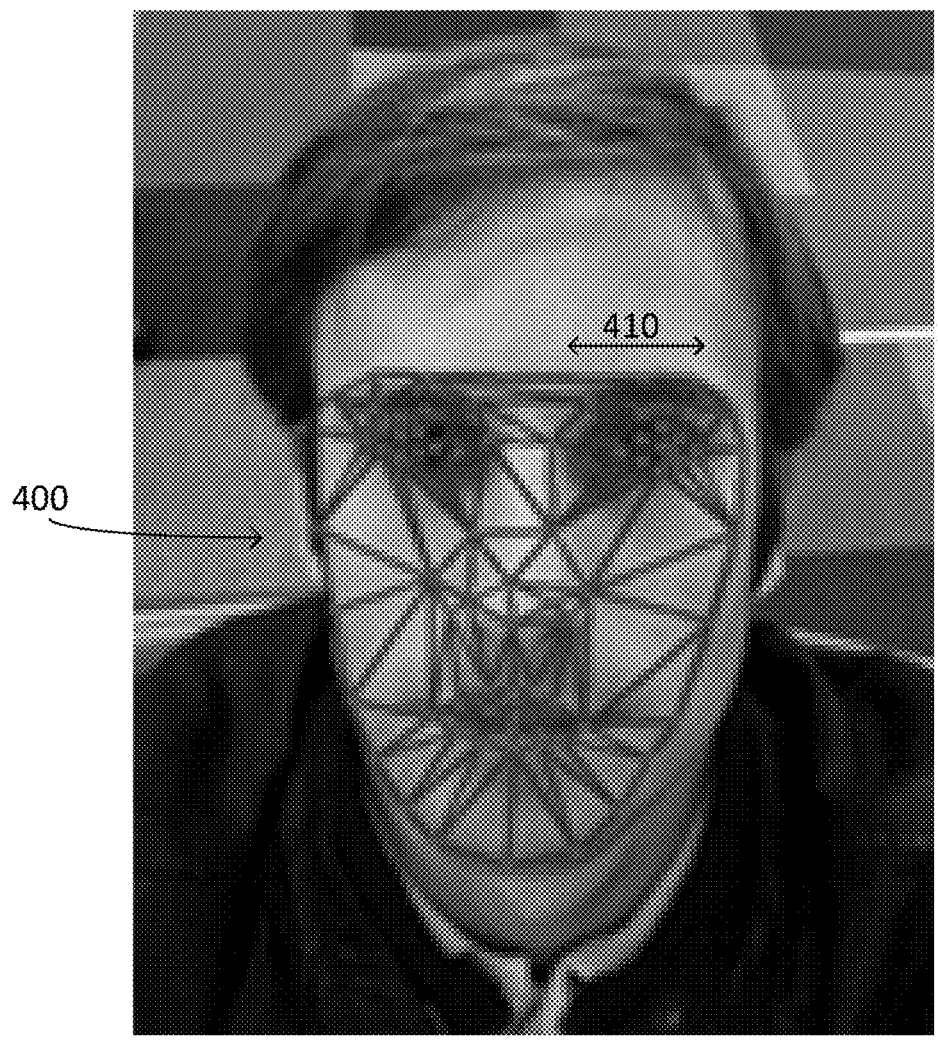
FIG. 4 is an example of a face-structure mask overlaid on top of a facial picture that was used to construct the face-structure mask.
Figure 5:
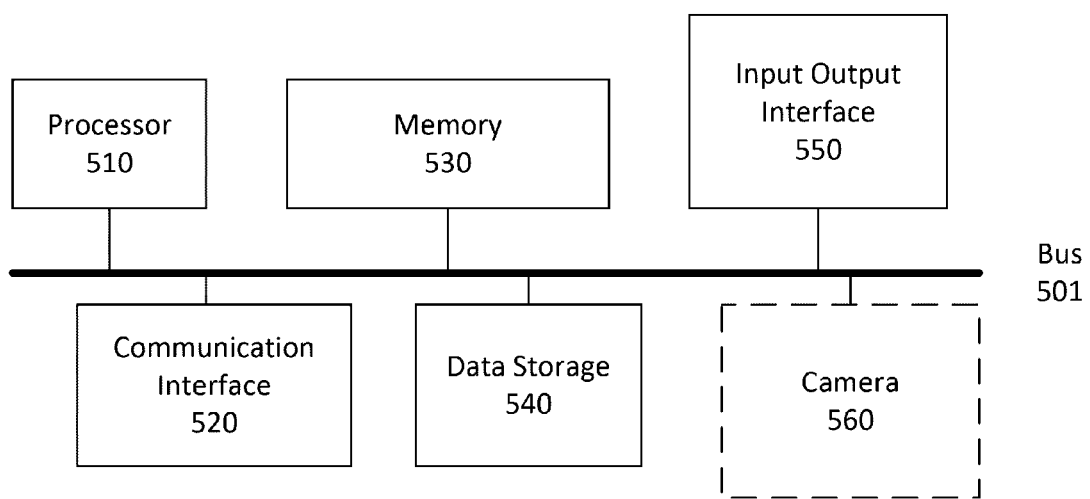
FIG. 5 is a diagram of an example computing environment in which implementations of the present disclosure may be practiced.

The face-structure mask module 130 constructs a face-structure mask 400 for each detected face. A face-structure mask 400 (an example of which is shown in FIG. 4) is created by identifying facial features for a detected face. The facial features can be identified by using variety of methods or a combination of different methods. Suitable facial feature identifying algorithms include, for example, the Active Shape Model algorithm. A face feature identifying method may be capable of detecting partial, hidden, or obscured hidden features. The face-structure mask 400 is then used to align the detected face. The software may save, for temporary use, a picture of the properly-aligned detected face. FIG. 5 shows an example face-structure mask 400 overlaid on top of a facial picture used to construct the face-structure mask 400.

The face space module 135 projects the picture of the face to a lower dimension face space, defined by a set of Fisher faces. This projection results in vector coordinates. Alternatively, different face recognition algorithms that utilize principal component analysis can be used to project the face to a lower dimension vector space, such as eigenfaces. The resulting vector may be sent to the server 190. Alternatively, the face space module 135 can be located in the server 190. In some implementations, the set of faces may be updated periodically from the server 190. In some implementations that do not require the server 190, the resulting vector may be used by the software to identify model face-structure masks 194 that are stored within memory 113. Furthermore, for implementations where the client device 110 includes the face category database 191, modification rules database 192 and the machine learning module 193, the software may perform the steps below that are described in relation to the server 190. Updates to client hosted databases can be provided via a networked connection on a regular basis or upon a trigger event, such as an updated database being made available by a remote computing device or via a mobile device application updating service, such as the APPLE® AppStore[SM].

The server interface module 140 may send the vector coordinates and user information to the server 190. The user information may contain, for example, the user's country of origin, location, gender, age, and/or ethnicity. The server interface module 140 may alternatively send the properly-aligned detected face if the face space module is located in the server 190.

The server 190 may categorize the received vector by searching through the face category database 191. The face category database 191 is created using Fisher faces to create clusters of categories from a plurality of training face samples. The Fisher faces used to create the face category database 191 are equivalent to the Fisher faces in the face space module 135. Each face category in the face category database 191 contains model face-structure masks 194, parameters, vectors, or cultural information describing or identifying the category. A face category may include multiple model face-structure masks 194. In addition, a model face-structure mask 194 may belong to many face categories. Each face-structure mask may have a popularity value or a weight associated with a face category. The server 190 finds the category that the received vector belongs to and also a set of associated model face-structure masks 194. In some implementations, the server 190 selects a set of associated model face-structure masks that are more popular or have higher weight for users within the face category. In other implementations, the server 190 selects a predetermined or configurable number of face structure masks that most closely resemble the face structure mask constructed at the user device, such that any modifications are subtle in nature. In some implementations, ties between face structure masks are broken based on the weights or popularity values stored in association with the face structure masks. The server 190 sends the set of associated model face-structure masks back to the client device 110.

The server 190 may also use the face category to look up modification instructions associated with the face category in the modification database 192. Alternatively, if the face category database 191 and the modification database 192 are combined, the server 190 may just query the combined database. The server 190 may also use the received user information to detect cultural modification instructions from the modification database 192. A cultural modification instruction may include, for example, whitening teeth for users from the United States. The server 190 may also contain user modification instructions that are associated with the user from the modification database 192. For example, one user may have an associated user modification instruction that modifies the cheekbones higher or broadens the chin on the detected face. The server 190 then sends all the modification instructions back to the client device 110. Alternatively, the server 190 may combine the modification instructions before sending the final modification instructions to the client device 110.

The client device 110 receives the modification instructions, category modification instructions, cultural modification instructions, and the user modification instructions, and combines them into final modification instructions. Alternatively the client device 110 receives the final modification instructions from the server. Instead of receiving the user modification instructions from the server 190, the client device 110 may store user modification instructions locally in the memory 113. The category, cultural and user modification instructions can be combined in different ways. For example, if there are any category modification instructions that conflict with the cultural modification instructions, the cultural modification instructions that are in conflict may be given priority. Additionally, if there are any cultural modification instructions in conflict with the user modification instructions, the user modification instructions may be given priority. Different modification instructions may be given priority over other modification instructions, and the final modification instructions can be constructed in some combination.

The adjustment module 150 uses the model face-structure masks and the final modification instructions to modify the region of the picture where the face is detected. The adjustment module 150 may adjust the detected face using the constructed face-structure mask with the received model face-structure masks and the modification instructions. For example, a modification instruction may lengthen, shorten, rotate, and otherwise alter parts of the constructed face-structure mask by comparing it to the face-structure masks of the model face-structure masks. For example, the adjustment module may adjust one or more facial feature such that its dimensions and parameters are a weighted average of the constructed face structure mask and the model face structure masks obtained from the server. The weights applied in the average may be based on the weights associated with the model face structure masks. The adjustment module 150 may also adjust the face using final modification instructions which may contain parameters or rules to modify a face. For example, a modification instruction may make a face more symmetrical by, for example, lengthening or shortening the face, or moving the position of the eyes with respect to the middle of the face. Modification instruction may also change different parts of a face in different ways. For example, a modification instruction may widen a forehead to normalize the ratio between the length and width of the face. For another example, a modification instruction may widen the eyes. A modification instruction may also remove a blemish or wrinkles around certain regions of the face or the entire face. Furthermore, a modification instruction may leave or add a blemish or wrinkles or a specific mole on a certain region of a face or the entire face. The adjustment module 150 may make multiple modifications to a single picture, and create multiple pictures, each picture containing a different set of modifications. If multiple faces were detected, the adjustment module may make multiple modifications for each detected face.

The user interface module 160 displays the adjusted picture or pictures to the user of the client device 110. The user interface module 160 may output images to a touchscreen, a monitor, or any other screen included or connected to the client device 110. The screen or the monitor may be connected directly to the client device 110 or through the network 180. The user interface module 160 may then receive user feedback on the presented picture or pictures. The feedback may be received through a touchscreen, a keyboard, a mouse, or any other input interface on the client device 110 or connect either directly or through the network 180. The user feedback may include whether to keep the picture, or a selection of pictures to keep if multiple pictures were presented. Furthermore, the feedback may include one or more specific modification to keep and one or more modifications to reject. For example, if the picture contains multiple faces, the feedback may be to keep one modification for a first face, and another modification for a second face. Furthermore, the feedback may include instructions to upload a selection of pictures onto the network 180, such as by sharing on a social media site or an online dating site, to attach the picture as an email, or to SMS message the picture.

The feedback process module 170 receives the user feedback from the user interface module 160 and performs according to the feedback. For example, if the feedback was to upload the picture, the feedback process module 170 will upload the selected pictures through the network 180. The feedback process module 170 also determines which model face-structure masks correspond to the user selected pictures, and which model face-structure masks correspond to the rejected pictures. The feedback process module 170 will send the user feedback and user information to the server 190.

At the server 190, the machine learning module 193 maintains the weights and popularity values associated with the model face-structure masks 194 and may increase or decrease the popularity value or weight of model face-structure masks associated with the user category. For example, a popularity or weight of a model face-structure mask may be increased if the user has selected to keep or post the picture that was merged with that model face-structure mask. In another example, a popularity value or weight of a model face-structure mask may be decreased if the user has rejected the picture that was merged with the model face-structure mask. The machine learning module 193 also maintains user modification instructions, culture modification instructions, and category modification instructions in the modification database 192. For example, if the server 190 receives feedback that a specific user does not like one type of modification, the machine learning module 193 will use that information to update the user modification instructions so that type of modification will occur less frequently in subsequent modifications. Culture modification instructions and category modification instructions can similarly be maintained by the machine learning module 193 using the received user feedback information. Alternatively, the user modification instructions may be stored in the client device 110, and a machine learning module in the client device (not shown) may maintain the user modification instructions. In general, the machine learning module 193 alters the user instructions based on less data than needed to alter cultural or category instructions.

In some implementations, the server 190 may be not required or may be unavailable. As such, copies of the face category database 191, modification rules database 192, and the machine learning module 193 may be stored within the memory 113 of the client device 110. Some or all of these components may be temporarily cached on the user device 110. For example, a model face-structure mask 194 may be stored on the user device 110 after it is received from the server 190. Some or all of these components may be permanently stored on the user device 110 and may be used when the communication interface 112 cannot connect to the server 190. In some implementations where the server 190 is not required, the communication interface 112 and the server interface module 140 may not be required. In some implementations, the client device 110 may use the server interface module 140 and the communication interface 112 to communicate with the server 190 in order to download and update the various modules and databases stored within the memory 113 of the client device 110.

Figure 2:
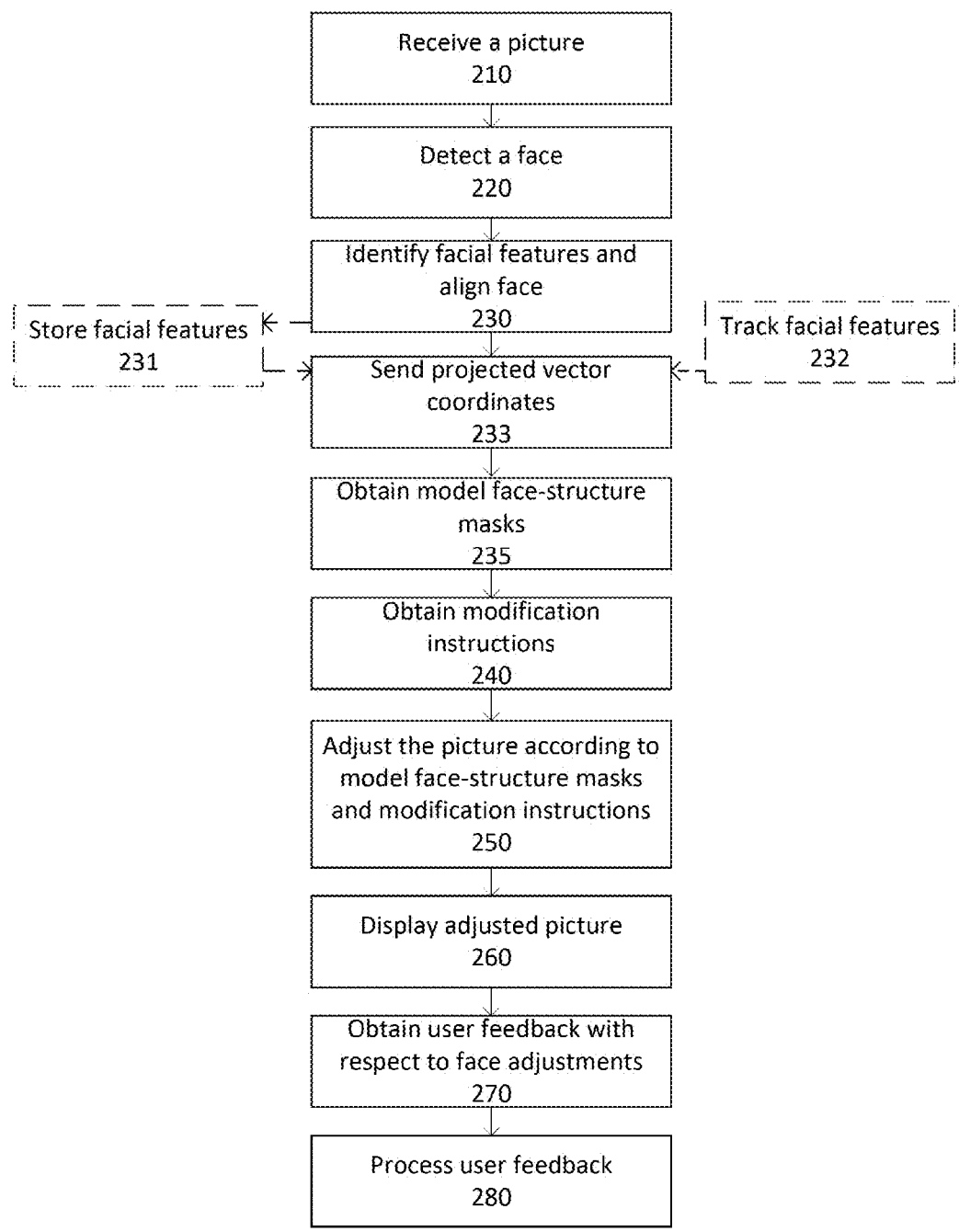
FIG. 2 is a flowchart of an example method for automatically editing a picture containing a face.

FIG. 2 is a flowchart of an example method that the software modules in FIG. 1 may perform for automatically editing a picture containing a face. The method includes receiving a picture (step 210) or a video from another software module stored in memory, a network 180, or through the camera 114 on the client device 110. If the picture or the video is received from a network 180, the picture or the video may, for example, be from a social networking site, an online dating site, an email, or a SMS text message. The video may be a stream of images or a burst of photos. One of the frames of the video is selected. In some implementations, the first frame of the video or the first picture in a burst of photos is selected. In general, any frame of the video or any picture in the burst of photos may be selected. In some implementations, if a face detected in an initially selected image frame is obscured, out-of-focus, or otherwise less suitable for facial analysis as described herein, a subsequent image may be selected and analyzed for face detection.

The method then includes detecting a face (step 220). The face is detected from the received picture or from the selected frame or picture. Detecting a face is performed by the face detection module 120 as described above. The method further includes identifying facial features (step 230) to construct a face-structure mask 400 to align the detected face. In some implementations, obscured or partial facial features may also be detected. In some implementations, if the picture is part of a video or a burst of photos, the method may include storing the identified facial features (step 231). One or more of the location, size, shape, rotations, and relation to other facial features may be saved.

Next, the aligned face is projected to a face space defined by a set of Fisher faces, resulting in vector coordinates in the face space. In some implementations, these vector coordinates are sent to a server (step 233). A face-structure mask 400 may also be sent to the server. Next, model face-structure masks are obtained (step 235). In some implementations, the model face-structure masks 194 are obtained from the server 190. The model face-structure masks 194 are associated with face categories and the server 190 chooses the set of model face-structure masks to send to the client device 110 based on the similarity of the model face structure masks to the mask generated for the face on the client device and/or on the popularity values and weights of each model face-structure mask 194. In some implementations, the model face structure masks 194 are selected from the face category database 191 that is stored within the client device 110.

Next, modification instructions are obtained (step 240), which will be described in FIG. 3. The obtained modification instructions may include face category modification instructions, cultural modification instructions, and user modification instructions, which are combined to final modification instructions. Alternatively, the obtained modification instructions may be final modification instructions. The face is then adjusted according to model face-structure masks and modification instructions (step 250). The modifications may result in one or multiple pictures. The adjusted picture is displayed (step 260), and user feedback with respect to the face adjustments is obtained (step 270). For example, the user may select to keep a picture or to keep a selection of pictures. The user feedback is then processed (step 280) by a machine learning module that may be on the client device 110 or the server 190. In addition, any actions specified by the user feedback is also performed, such as to upload a modified picture to a network 180.

In some implementations where a video or a burst of photos is received in step 210, after the selected frame or picture is processed, one or more of the remaining frames or photos in the burst of photos may be processed. In some implementations, the remaining frames or photos are processed one by one in chronological order. For the remaining frames, the method may track facial features 232 that were saved in step 231. Because facial features were saved in the previous frame of the previous photo, the facial features in the next frame or photo will have similar locations, sizes, shapes, rotations, and relationships to other facial features. After the facial features are tracked, the rest of the processing for the frame or the photo is the same as the selected picture. After every or set number of frames or photos are processed, the final video may be presented to the user for feedback and saved in memory 113.

Figure 3:
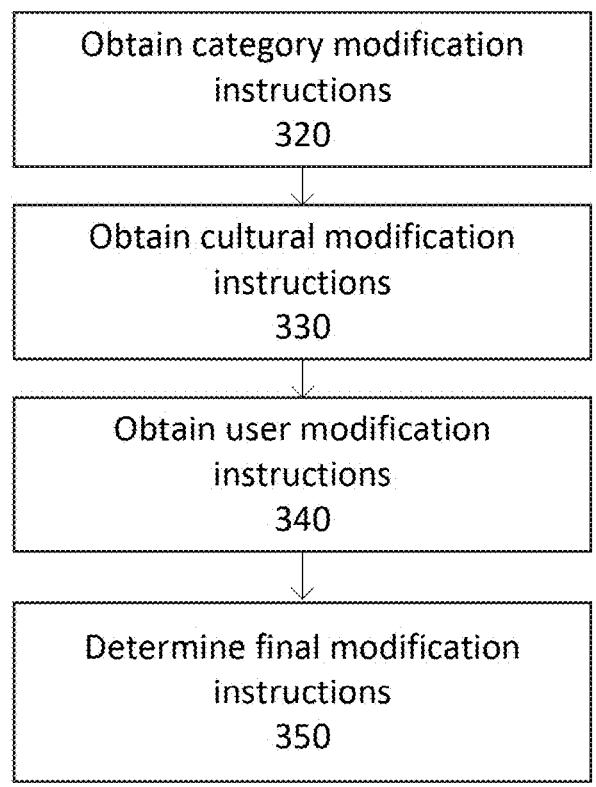
FIG. 3 is a flowchart of an example method for determining appropriate modifications to make to a face.

FIG. 3 is a flowchart of an example method for determining final modification instructions for altering a picture of a face. The client device 110 obtains a category modification instruction (step 320). The client device 110 may also obtain a cultural modification instruction (step 330) based on the detected face, face-structure mask 400, and user information. For example, the client device 110 or the server 190 may determine the ethnicity of the detected face, or determine the country location based on the user information. The client device 110 may also obtain the user modification instructions (step 340), by looking up a user identification from the received user information, and using the user identification to look up the corresponding user modification instructions in the modification database 192. In some implementation, the server 190 may send one or more of the category modification instructions, cultural modification instructions, or the user modification instructions to the client device 110. The client device 110 may combine the modification instructions to a final modification instructions (step 350). The server 190 may alternatively combine the modification instructions to create a set of final modification instructions and send the final modification instructions to the client device 110.

FIG. 4 is an example of a face-structure mask 400 overlaid on top of a facial picture. A face-structure mask 400 may be constructed in the face-structure mask module 130, and also be associated to one or more face category in the face category database 191. A plurality of face-structure masks may be used in the adjustment module 150 to adjust the face. For example, the length of an eye of the constructed face-structure mask may be lengthened 410 closer in length to the corresponding eye on a received face-structure mask. In another example, the ratios of different parts of the face may be adjusted. In some implementations, modification instructions may modify the face-structure mask 400.

FIG. 5 is a diagram of an example computing environment in which implementations of the present disclosure may be practiced. This example environment may be a client device 110 or a server 190. The environment may include a bus 501 connecting together a processor 510, a communication interface 520, memory 530, data storage 540, and an input output interface 550. The processor 510 may be manufactured or designed by Intel, AMD, Nvidia, ARM, Apple, or Samsung. The communication interface 520 may be through Ethernet, 3G, 4G, 4G LTE, or through wireless signals. The memory 530 may include DRAM, SRAM, flash memory, microSD memory. The data storage 540 may be a hard drive, an solid-state drive, or another form of a non-volatile memory storage. The input output interface 550 may include an interface to send or receive signals from a touchscreen, a monitor, a keyboard, a mouse, or any other input or output device. The processor 510 executes the software stored in the memory 530, and interacts with an user of the environment through the input output interface 550. The data storage 540 may store the software and any other data that may be required during the operation of the methods. The communication interface 520 allows the software to communicate with one or more networks, including but not limited a local area network, a remote network, or a network of networks (e.g., internet). The software may receive a picture from the communication interface 520, or the input output interface 550. Optionally, a camera 560 may be connected to the bus 501 or the input output interface 550 to provide a picture or a video for the software.

The invention claimed is:

1. A system for automatically modifying pictures containing faces, the system comprising:
   a communication interface configured to communicate with a server;
   a memory that stores computer executable instructions, comprising:
      a face detection module configured to detect a face in a picture;
      a face-structure mask module configured to construct a face-structure mask for the detected face;
      a face space module configured to project the detected face into a lower dimensional face space resulting in a set of lower-dimensional vector coordinates;
      a server interface module configured to
         send the set of lower-dimensional vector coordinates to the server via the communication interface, and
         receive, responsive to the set of lower-dimensional vector coordinates sent to the server, a set of model face-structure masks and modifications instructions via the communication interface;
      an adjustment module configured to adjust the detected face in the picture according to the received set of model face-structure masks and modification instructions;
      a user interface module configured to display an adjusted picture and to receive user feedback;
      an input process module configured to process the received user feedback; and
   a processor capable of executing the computer executable instructions of the modules stored in the memory.

2. The system of claim 1, wherein the face detection module is configured to:
   apply a primary face detection method to the picture;
   responsive to not detecting the face with the primary face detection method, apply a secondary face detection method to the picture;
   responsive to not detecting the face with the secondary face detection method, apply a tertiary face detection method to the picture; and
   responsive to not detecting a face with the tertiary face detection method, issue an error.

3. The system of claim 1, wherein the face-structure mask module is configured to:
   identify facial features for the detected face in the picture;
   construct the face-structure mask for the detected face in the pictures using the identified facial features; and
   align the detected face using the constructed face-structure mask.

4. The system of claim 1, wherein the server interface module is configured to:
   send the detected face, the constructed face-structure mask, and user information to the server, wherein the server is configured to access a category database and a modification database;
   obtain a set of category modification instructions associated with the detected face from the server;
   obtain a set of cultural modification instructions associated with the detected face and the user information from the server;
   obtain a set of user modification instructions associated with the user information; and
   determine a set of final modification instructions from the obtained set of category modification instructions, the obtained set of cultural modification instructions, and the obtained set of user modification instructions; and wherein
   the adjustment module is configured to adjust the detected face in the picture according to the determined set of final modification instructions.

5. The system of claim 4, wherein the cultural modification instructions comprise a set of instructions tailored to a user based on one or more of:
   a gender of the user;
   an age of the user;
   an ethnicity of the user;
   country of origin of the user; and
   cultural identification associated with the user.

6. The system of claim 4, wherein the user modification instructions are received from the server.

7. The system of claim 4, wherein the user modification instructions are obtained from within a client device of the system.

8. The system of claim 1, wherein the adjustment module is configured to
   adjust the detected face in the picture by merging the constructed face-structure mask for the detected face to the received set of model face-structure masks according to the received modification instructions.

9. The system of claim 1, wherein the adjustment module is further configure to create multiple pictures, each picture adjusted differently, according to different model face-structure masks and the modification instructions.

10. The system of claim 1, wherein the user interface module is configured to:
    display the adjusted picture; and
    receive a user feedback on whether to keep the adjusted picture.

11. The system of claim 1, wherein the user interface module is configured to:
    display the adjusted picture; and
    receive a user feedback on whether to send the adjusted picture to a network.

12. The system of claim 9, wherein the user interface module is configured to:
    display multiple pictures; and
    receive a user feedback on which pictures to keep and/or send to a network.

13. The system of claim 1, wherein the input process module is configured to
    send user information and the received user feedback to the server.

14. The system of claim 1, wherein the input process module is configured to send to the server an indication of which model face-structure masks were selected and which model face-structure mask were rejected by the user.

15. The system of claim 7, wherein the input process module is configured to:
    update the user modification instructions by using machine learning on the received user feedback; and
    save the user modification instructions within the client device.

16. A machine-implemented method for automatically modifying pictures containing faces, the method comprising:
    detecting, by a processor in a client device, a face in a picture;
    constructing, by the processor, a face-structure mask for the detected face;
    projecting, by the processor, the detected face to a set of lower-dimensional vector coordinates;
    sending the set of lower-dimensional vector coordinates from the client device to a server;
    receiving, from the server, a set of model face-structure masks responsive to the set of lower-dimensional vector coordinates sent from the client device;
    receiving a set of final modification instructions;
    adjusting the picture, by the processor, by merging the constructed face-structure mask for the detected face to the received set of model face-structure masks according to the received final modification instructions; and
    displaying the adjusted picture by the client device.

17. The method of claim 16, wherein receiving the set of final modification instructions comprises:
    obtaining a set of category modification instructions associated with the detected face from the server;
    obtaining a set of cultural modification instructions associated with the detected face and the user information from the server;
    obtaining a set of user modification instructions associated with the user information; and
    determining the set of final modification instructions from the category modification instructions, cultural modification instructions, and user modification instructions.

18. The method of claim 17, comprising receiving the user modification instructions from the server.

19. The method of claim 17, comprising:
    receiving user feedback regarding the adjusted picture; and
    processing the user feedback by sending, to the server, an indication of which model face-structure masks were selected and which model face-structure mask were rejected.

20. The method of claim 19, wherein processing user feedback comprises:
    updating the user modification instructions by using machine learning on the received user feedback; and
    saving the user modification instructions within the client device.

21. A system for automatically modifying pictures containing faces, the system comprising:
    a user interface configured to display an adjusted picture and to receive user feedback;
    a processor capable of executing computer executable instructions;
    a memory that that stores computer executable instructions that, when executed by the processor, cause the processor to:
    detect a face in a picture;
    construct a face-structure mask for the detected face;
    project the detected face into a lower dimensional face space resulting in a set of vector coordinates;
    send the set of lower-dimensional vector coordinates to a server via a network;
    receive, from the server, a set of model face-structure masks responsive to the sent set of vector coordinates;
    select a set of modifications instructions from a modification database;
    adjust the face in the picture according to the received set of model face-structure masks and a set of final modification instructions determined from the set of modifications instructions;
    process user feedback accepting the adjusted picture; and
    maintain, using a machine learning module, the modification database based on the user feedback.

* * * * *